(12) United States Patent
Kim et al.

(10) Patent No.: US 9,353,255 B2
(45) Date of Patent: May 31, 2016

(54) ACRYLONITRILE-ACRYLATE-STYRENE GRAFT COPOLYMER AND THERMOPLASTIC RESIN COMPOSITION COMPRISING THEREOF

(71) Applicant: LG CHEM, LTD., Seoul (KR)

(72) Inventors: Min Jung Kim, Daejeon (KR); Yong Yeon Hwang, Daejeon (KR); Chun Ho Park, Daejeon (KR); Sang Mi Lee, Daejeon (KR); Yeong Min Lee, Daejeon (KR); Eun Soo Kang, Daejeon (KR); Hye Kyung Han, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/118,678

(22) PCT Filed: Jul. 16, 2013

(86) PCT No.: PCT/KR2013/006356
§ 371 (c)(1),
(2) Date: Nov. 19, 2013

(87) PCT Pub. No.: WO2014/035055
PCT Pub. Date: Mar. 6, 2014

(65) Prior Publication Data
US 2014/0235749 A1    Aug. 21, 2014

(30) Foreign Application Priority Data

Aug. 27, 2012 (KR) .................. 10-2012-0093623
Jul. 15, 2013 (KR) .................. 10-2013-0082681

(51) Int. Cl.
  C08L 51/00   (2006.01)
  C08L 51/04   (2006.01)
  C08F 265/04  (2006.01)
  C08F 285/00  (2006.01)
  C08L 25/12   (2006.01)
  C08F 220/18  (2006.01)

(52) U.S. Cl.
  CPC ............ *C08L 51/003* (2013.01); *C08F 265/04* (2013.01); *C08F 285/00* (2013.01); *C08L 25/12* (2013.01); *C08F 2220/1825* (2013.01)

(58) Field of Classification Search
  USPC ........................................................... 525/85
  See application file for complete search history.

(56) References Cited

U.S. PATENT DOCUMENTS

| 6,087,449 | A | 7/2000 | Tiefensee et al. |
| 6,111,012 | A * | 8/2000 | Fischer et al. .................. 525/64 |
| 6,271,898 | B1 * | 8/2001 | Clikeman ............ G02F 1/1334 349/86 |
| 6,316,527 | B1 | 11/2001 | Meyer et al. |
| 6,475,608 | B2 * | 11/2002 | Allen .................... B32B 27/36 359/577 |
| 2007/0287799 | A1 | 12/2007 | Ha et al. |
| 2014/0107276 | A1 * | 4/2014 | Kim et al. ..................... 524/504 |

FOREIGN PATENT DOCUMENTS

| CN | 101360770 A | 2/2009 |
| JP | 1990-292351 A | 12/1990 |
| JP | 09-189898 A | 7/1997 |
| KR | 10-0834423 B1 | 6/2008 |
| KR | 10-0988999 B1 | 10/2010 |
| KR | 10-1040827 B1 | 6/2011 |
| KR | 1285494 | * 7/2013 |

* cited by examiner

*Primary Examiner* — Jeffrey Mullis
(74) *Attorney, Agent, or Firm* — Dentons US LLP

(57) ABSTRACT

Disclosed are an acrylonitrile-acrylate-styrene graft copolymer having a structure including a seed which comprises at least one of an aromatic vinyl compound, a vinyl cyanide compound and an alkyl (meth)acrylate compound, a core which surrounds the seed and comprises alkyl acrylate, and a shell which surrounds the core and comprises at least one of an aromatic vinyl compound, a vinyl cyanide compound and an alkyl (meth)acrylate compound, and having suitably controlled thicknesses and refractive indexes of the respective layers, and a thermoplastic resin composition comprising the acrylonitrile-acrylate-styrene graft copolymer.

12 Claims, No Drawings

ACRYLONITRILE-ACRYLATE-STYRENE GRAFT COPOLYMER AND THERMOPLASTIC RESIN COMPOSITION COMPRISING THEREOF

This application is a National Stage Application of International Patent Application No. PCT/KR2013/006356, filed Jul. 16, 2013, and claims the benefit of Korean Patent Application No. 10-2012-0093623 filed on Aug. 27, 2012, and Korean Patent Application No. 10-2013-0082681 filed on Jul. 15, 2013, in the Korean Intellectual Property Office.

TECHNICAL FIELD

The present invention relates to an acrylonitrile-acrylate-styrene graft copolymer and a thermoplastic resin composition comprising the same. More specifically, the present invention relates to an acrylonitrile-acrylate-styrene graft copolymer having a controlled rubber morphology and a difference in refractive index in consideration of refractive index of a target matrix polymer, and a thermoplastic resin composition with superior impact resistance, weather resistance and appearance, comprising the same.

BACKGROUND ART

An ABS resin is an acrylonitrile-butadiene-styrene terpolymer which is widely utilized in a variety of fields including electric and electronic products, construction materials and automobiles due to excellent impact resistance, strength, chemical resistance and processability. However, an ABS resin is disadvantageously unsuitable for use in exterior materials because a butadiene polymer is used as a rubber, and thus has poor weather resistance.

Meanwhile, in order to obtain thermoplastic resins with superior physical properties, weather resistance and aging resistance, an ethylene unsaturated polymer should not be present in an acrylonitrile-acrylate-styrene graft copolymer. An ASA (acrylonitrile-styrene-acrylate terpolymer) resin employing a cross-linked alkyl acrylate rubber polymer was demonstrated to be suitable as a representative example of thermoplastic resins with excellent weather resistance and aging resistance. Such an ASA resin has superior weather resistance and aging resistance and is utilized in a variety of applications including automobiles, ships, leisure products, construction materials and gardening materials.

A method for preparing an ASA polymer with superior weather resistance and aging resistance is disclosed in German Patent No. 1,260,135. A core used for this method is a large-diameter latex of cross-linked acrylate with a mean particle diameter of 150 to 800 nm and a narrow particle size distribution. As compared to a polymer prepared using a small-diameter polyacrylate latex, a polymer comprising a large-diameter polyacrylate latex has improved notch impact strength, high hardness and reduced shrinkage. However, the large-diameter acrylonitrile-acrylate-styrene graft copolymer has a disadvantage of difficulty of coloring as compared to small-diameter acrylonitrile-acrylate-styrene graft copolymers.

Use of corresponding ASA polymers for preparing color articles is limited. That is, a pale pastel color is obtained rather than a vibrant color.

For reference, materials known to date have superior weather resistance and mechanical properties and improved colorability. However, improvement in colorability by these materials is yet insufficient due to use in conjunction with large-diameter acrylonitrile-acrylate-styrene graft copolymers that deteriorate colorability. Because these materials employ a cross-linked alkyl acrylate polymer as a rubber component, they cannot obtain a clear color due to excessively low refractive index of alkyl acrylate, as compared to styrene and acrylonitrile.

Use of a multi-layer alkyl acrylate rubber polymer including a diene rubber polymer in order to overcome this disadvantage is suggested in Japanese Patent Publication Sho. 47-47863, Japanese Patent Publication Sho. 59-49245, Japanese Patent Publication Hei. 3-66329 and the like.

However, these patents are disadvantageously unsuitable for preparation of resins with superior weather resistance because an alkyl acrylate polymer outer layer does not sufficiently surround a diene polymer inner layer.

DISCLOSURE

Technical Problem

Therefore, it is one object of the present invention to provide an acrylonitrile-acrylate-styrene graft copolymer having a controlled rubber morphology and differences in refractive index in consideration of refractive index of a target matrix polymer, and a thermoplastic resin composition with superior impact resistance, weather resistance and appearance comprising the same.

Technical Solution

In accordance with one aspect of the present invention, the above and other objects can be accomplished by the provision of an acrylonitrile-acrylate-styrene graft copolymer composition comprising a graft copolymer and a matrix polymer, wherein the graft copolymer comprises a seed comprising at least one of an aromatic vinyl compound, a vinyl cyanide compound and an alkyl (meth)acrylate compound, a rubber core surrounding the seed and comprising alkyl acrylate, and a shell surrounding the core and comprising at least one of an aromatic vinyl compound, a vinyl cyanide compound and an alkyl (meth)acrylate compound, wherein a morphology of the rubber core satisfies the following Equations 1 and 2, a difference between a refractive index of the seed or the shell and a refractive index ($\mu_D^{25}$) of the matrix polymer is lower than 0.035, is equivalent to or lower than 0.03 or is equivalent to or lower than 0.02 and a difference between a refractive index of the core and a refractive index ($\mu_D^{25}$) of the matrix polymer is higher than 0.056, is equivalent to or higher than 0.08, or is equivalent to or higher than 0.1.

$$140 < 2*r2 < 380 \quad \text{Equation 1}$$

$$r2 - r1 < 80 \quad \text{Equation 2}$$

wherein r1 represents a thickness (nm) from the center to the seed of the graft copolymer and r2 represents a thickness (nm) from the center to the core of the graft copolymer.

Equation 1 may be for example $150 \leq 2*r2 \leq 370$, $150 \leq 2*r2 \leq 350$ or $200 \leq 2*r2 \leq 300$.

Equation 2 may be for example $10 \leq r2-r1 \leq 70$, $20 \leq r2-r1 \leq 50$, or $20 \leq r2-r1 \leq 40$.

In addition, the acrylonitrile-acrylate-styrene (ASA) graft copolymer composition may comprise the acrylonitrile-acrylate-styrene graft copolymer and the matrix polymer at a weight ratio of 10:90 to 90:10, 10:90 to 60:40, or 15:85 to 50:50.

The matrix polymer may, for example, be selected from polymers comprising one or more compounds of an aromatic vinyl compound, a vinyl cyanide compound and an alkyl (meth)acrylate compound.

In accordance with another aspect of the present invention, provided is a molded article produced from the copolymer composition, wherein the molded article has enhanced impact resistance, weather resistance, colorability and gloss, and thus improved appearance.

Hereinafter, the present invention will be described in detail.

The present invention is characterized in that layer thicknesses and refractive indexes of seed and core are controlled so as to provide an acrylonitrile-acrylate-styrene graft copolymer which maintains conventional impact properties through controlled rubber morphology and consideration of refractive index of the target matrix polymer, prevents deterioration in colorability based on the refractive index of the seed controlled to be similar to that of the target matrix polymer, and exhibits improved colorability and thus superior appearance properties due to control of morphology of the core having a great difference in refractive index with the target matrix polymer.

The acrylonitrile-acrylate-styrene graft copolymer according to the present invention may be an ASA graft copolymer which comprises: a seed comprising at least one of an aromatic vinyl compound, a vinyl cyanide compound and an alkyl (meth)acrylate compound; a rubber core surrounding the seed and comprising alkyl acrylate; and a shell surrounding the core and comprising at least one of an aromatic vinyl compound, a vinyl cyanide compound, and an alkyl (meth) acrylate compound.

A weight ratio of the seed to the core to the shell constituting the ASA graft copolymer is particularly preferably (5 to 40):(20 to 60):(20 to 60), or (10 to 35):(30 to 55):(30 to 50) in view of maintenance of suitable impact resistance and improvement of colorability.

In addition, when the core is used in an amount lower than the range defined above, rubber content is low and impact resistance enhancement of the graft copolymer is thus deteriorated, and when the rubber content exceeds the range defined above and the shell content is lower than the range, rubber particles may be clumped during aggregation, the effect of enhancing impact resistance is reduced, resin compatibility is considerably low and a desired level of refractive index cannot be obtained.

When the content of the seed is low, appearance properties are bad and when the content of the seed is excessive, impact strength is deteriorated.

In addition, when the content of alkyl acrylate constituting the core is low, rubber content is low and impact resistance is thus deteriorated, and when the content of alkyl acrylate is excessively high, rubber particles may clump due to low content of the shell, resin compatibility is considerably low, and the effect of enhancing impact resistance and a refractive index are low.

Examples of the alkyl acrylate contained in the core include methyl acrylate, ethyl acrylate, propyl acrylate, butyl acrylate, hexyl acrylate, octyl acrylate, 2-ethylhexyl acrylate and the like. Specifically, the alkyl acrylate may be n-butyl acrylate, 2-ethylhexyl acrylate or the like.

The rubber core may be an acrylic rubber obtained by polymerizing a substance comprising alkyl acrylate with a cross-linking agent. When the cross-linking agent is contained, gel content can be controlled and strength is excellent.

Meanwhile, mean particle diameter from the seed to the core is for example higher than 0.14 µm and lower than 0.38 µm and is preferably 0.15 to 0.37 µm, 0.15 to 0.35 µm, or 0.2 to 0.3 µm in terms of maintenance of balance between impact resistance and colorability.

Furthermore, the aromatic vinyl compound that can be used for the seed and the shell may comprise at least one selected form the group consisting of styrene, α-styrene, p-styrene, vinyl toluene and styrene monomer derivatives.

In addition, the vinyl cyanide compound that can be used for the seed and the shell may be acrylonitrile, methacrylonitrile or a mixture thereof.

The alkyl (meth)acrylate compound that can be used for the seed and the shell may comprise at least one selected from the group consisting of methyl acrylate, ethyl acrylate, propyl acrylate, butyl acrylate, 2-ethyl hexyl acrylate, methyl methacrylate, ethyl methacrylate, propyl methacrylate, 2-ethyl hexyl methacrylate, methyl ethacrylate and ethyl ethacrylate.

In one embodiment, the seed and/or the core may further comprise at least one compound represented by the following Formula 1 as a cross-linking agent:

Formula 1 wherein A independently represents a substituent having a vinyl group or a (meth)acrylate group, and A' represents a hydrogen group, a substituent having a vinyl group, a C1 to C30 alkyl group, a C5 to C24 arylalkyl group, a C5 to C24 arylamine group or a C6 to C30 aryl group, and R independently represents a divalent ethyl group or a propyl group, and n is an integer of 0 to 15, 0 to 5, or 0 to 4.

In another embodiment, the seed and/or the core may further comprise, as a crosslinking agent, at least one selected from the group consisting of divinylbenzene, 1,3-butanediol diacrylate, 1,3-butanediol dimethacrylate, 1,4-butanediol diacrylate, 1,4-butanediol dimethacrylate, aryl acrylate, aryl methacrylate, trimethylol propane triacrylate, tetraethylene glycol diacrylate, ethylene glycol dimethacrylate, diethylene glycol dimethacrylate, triethylene glycol dimethacrylate, neopentyl glycol dimethacrylate, triallyl isocyanurate, triarylamine and diallylamine.

The crosslinking agent is for example used in an amount of 0.01 to 5 parts by weight, or 0.1 to 3 parts by weight, based on 100 parts by weight in total of the monomer used for preparation of the ASA-based graft copolymer.

In addition, the shell is for example present in an amount of 20 to 60 parts by weight, based on 100 parts by weight in total of the monomer constituting the ASA-based graft copolymer. When the content of the shell is low, graft efficiency is deteriorated, the rubber clumps, resin compatibility is decreased and impact resistance enhancement effect is deteriorated, and when the content of the shell is excessively high, impact resistance efficiency is disadvantageously deteriorated due to decrease in relative content of rubber.

In one embodiment, the shell is a copolymer comprising at least one selected from the group consisting of alkyl methacrylate, an aromatic vinyl compound and a vinyl cyanide compound in order to control polymerization reactivity and refractive index to desired levels and is formed by graft polymerization.

In another embodiment, the shell is a copolymer comprising an aromatic vinyl compound and a vinyl cyanide compound, or comprising an aromatic vinyl compound, a vinyl cyanide compound and alkyl methacrylate, and is formed by graft polymerization.

The final gel content of the ASA graft copolymer is for example lower than 92%, or is lower than 90%, or is 30 to 90% and a graft ratio thereof is higher than 20%, is equivalent to or higher than 25%, or is 25 to 100% or 25 to 80%. When the gel content falls within the range defined above, strength is excellent, and when the graft ratio is within the range defined above, there is an advantage in terms of dispersion due to improved aggregation.

Morphology of the rubber core satisfies the following Equations 1 and 2:

$$150 \leq 2*r2 \leq 350 \quad \text{Equation 1}$$

$$20 \leq r2-r1 \leq 50 \quad \text{Equation 2}$$

wherein r1 represents a thickness (nm) from the center to the seed of the graft copolymer and r2 represents a thickness (nm) from the center to the core of the graft copolymer.

r1 for example is a radius or a mean radius of the seed, which means ½ of a particle diameter or a mean particle diameter of the seed.

r2 for example is a radius or a mean radius of a core including the seed, which means ½ of a particle diameter or a mean particle diameter of the core including the seed.

As can be demonstrated from Example described below, when the equations associated with thicknesses of the seed and the core are satisfied, the thickness of a core portion having a great difference in refractive index with a matrix portion is decreased and the size of the core is suitably controlled, thus providing transparency and an effect of remarkably enhancing colorability.

Furthermore, the present invention is characterized in that the difference between the refractive index of the seed and/or the shell and the refractive index ($\mu_D^{25}$) of the matrix polymer is lower than 0.035 and the difference between the refractive index of the core and the refractive index ($\mu_D^{25}$) of the matrix polymer is higher than 0.056. The matrix polymer may be at least one selected from matrix polymers comprising one or more of an aromatic vinyl compound, a vinyl cyanide compound and an alkyl (meth)acrylate compound.

The matrix polymer may be for example a hard matrix resin.

The hard matrix resin means a resin which comprises a hard polymer-forming monomer having a glass transition temperature of at least 80° C. or 80 to 200° C.

As another example, the matrix polymer may be a SAN (styrene-acrylonitrile) resin.

The difference between the refractive index of the seed or the refractive index of the shell and the refractive index ($\mu_D^{25}$) of the matrix polymer is preferably lower than 0.035, is equivalent to or lower than 0.03, or is lower than 0.03 in terms of colorability based on transparency imparted to the graft copolymer.

The difference between the refractive index of the seed and the refractive index ($\mu_D^{25}$) of the matrix polymer is higher than 0.056, or is equivalent to or higher than 0.08, or is 0.06 to 0.15 or 0.08 to 0.13 in terms of remarkable improvement in colorability. When butadiene, styrene or the like having a relatively high refractive index is used as the core in order to reduce the difference in refractive index, both weather resistance and impact strength are disadvantageously deteriorated.

Specifically, the ASA graft copolymer composition according to the present invention may comprise the acrylonitrile-acrylate-styrene graft copolymer and, as a thermoplastic matrix resin, a hard matrix resin comprising at least one of an aromatic vinyl compound, a vinyl cyanide compound and an alkyl (meth)acrylate compound in a weight ratio of 10:90 to 90:10.

The acrylonitrile-acrylate-styrene graft copolymer may be for example prepared by a method well known in the art, such as emulsion polymerization.

In another example, the acrylonitrile-acrylate-styrene graft copolymer of the present invention may be prepared by the following three steps. For reference, the content of the acrylonitrile-acrylate-styrene graft copolymer is based on 100 parts by weight in total of the monomer used for preparation of the acrylonitrile-styrene-acrylate copolymer.

First, in the first step, a seed is prepared by polymerizing 4 to 30 parts by weight of a monomer or a monomer mixture comprising at least one selected from an aromatic vinyl compound, a vinyl cyanide compound and alkyl(meth)acrylate. The monomer mixture may for example further comprise 0.001 to 1 parts by weight of an electrolyte, 0.01 to 3 parts by weight of a crosslinking agent, 0.01 to 3 parts by weight of a polymerization initiator and 0.01 to 5 parts by weight of an emulsifying agent.

Then, in the second step, a core is prepared by polymerizing a monomer mixture comprising 20 to 80 parts by weight of an alkyl acrylate monomer and 0.01 to 3 parts by weight of a crosslinking agent in the presence of the seed. In addition, the monomer mixture may further comprise 0.01 to 3 parts by weight of a polymerization initiator and 0.01 to 5 parts by weight of an emulsifying agent.

Then, in the third step, a graft shell is prepared by polymerizing 10 to 70 parts by weight of a monomer or a monomer mixture of at least one selected from the group consisting of an aromatic vinyl compound, a vinyl cyanide compound and alkyl (meth)acrylate in the presence of the rubber core. Furthermore, the monomer mixture may for example further comprise 0.01 to 3 parts by weight of a polymerization initiator, 0 to 3 parts by weight of a molecular weight modifier and 0.01 to 5 parts by weight of an emulsifying agent.

The thermoplastic resin composition of the present invention may further comprise 0.1 to 10 parts by weight of at least one additive selected from the group consisting of a flame retardant, a lubricant, an antimicrobial agent, a release agent, a nucleating agent, a plasticizer, a thermostabilizer, an anti-oxidant, a photostabilizer, a UV stabilizer, a compatibilizer, a pigment, a dye and an inorganic additive, based on 100 parts by weight in total of the ASA graft copolymer and the matrix resin.

In another example, the thermoplastic resin composition may further comprise 0.1 to 5 parts by weight or 0.1 to 3 parts by weight of at least one additive selected from the group consisting of a lubricant, an anti-oxidant, a UV stabilizer, a pigment and an inorganic additive, based on 100 parts by weight in total of the ASA graft copolymer and the matrix resin.

A molded article prepared from the thermoplastic resin composition exhibits improved impact resistance, weather resistance, colorability and gloss, and thus enhanced appearance, and is thus useful for automobile components, electric and electrical components or construction materials, but the present invention is not limited to these applications.

Advantageous Effects

Advantageously, the present invention provides an acrylonitrile-acrylate-styrene graft copolymer which maintains conventional impact properties in consideration of refractive index of a target matrix polymer, prevents deterioration in colorability due to refractive index of the seed controlled to be similar to that of the target matrix and exhibits superior appearance when applied to thermoplastic resin compositions due to control of morphology of the core having a great difference in refractive index with the target matrix polymer.

BEST MODE

Now, preferred examples will be provided for better understanding of the present invention. These examples are provided only to illustrate the present invention and should not be construed as limiting the scope and spirit of the present invention.

Example 1

A thermoplastic resin composition was prepared by mixing 40 parts by weight of an acrylonitrile-acrylate-styrene graft copolymer comprising 20% by weight of styrene as a seed, 45% by weight of butyl acrylate as a core and 35% by weight of styrene-acrylonitrile (containing 26.25% by weight of SM and 8.75% by weight of AN) as a shell, and having r1 of 75 nm and r2 of 115 nm, 60 parts by weight of a styrene-acrylonitrile copolymer (containing 45 parts by weight of SM and 15 parts by weight of AN and having a refractive index of 1.573), 1 part by weight of a lubricant, 0.5 parts by weight of an antioxidant and 0.5 parts by weight of a UV stabilizer. In this case, a difference in refractive index between the seed or the shell of the acrylonitrile-acrylate-styrene graft copolymer, and the matrix was lower than 0.02, a difference in refractive index between the core and the matrix was 0.11, and the acrylonitrile-acrylate-styrene graft copolymer had a gel content lower than 90%, and a graft ratio of 35%.

For reference, desired levels of r1 and r2 could be obtained by controlling the content of the emulsifying agent during polymerization, and SM means styrene monomer, AN means acrylonitrile monomer, MMA means methyl methacrylate, BA means butyl acrylate and 2-EHA means 2-ethylhexyl acrylate.

Example 2

A thermoplastic resin composition was prepared in the same manner as in Example 1, except that 10% by weight of styrene was used as the seed, 55% by weight of butyl acrylate was used as the core, 35% by weight of styrene-acrylonitrile (containing 26.25% by weight of SM and 8.75% by weight of AN) was used as the shell, r1 was 35 nm and r2 was 75 nm. In this case, differences in refractive index, a gel content and a graft ratio were the same as in Example 1.

Example 3

A thermoplastic resin composition was prepared in the same manner as in Example 1, except that 25% by weight of styrene was used as the seed, 45% by weight of butyl acrylate was used as the core, 30% by weight of styrene-acrylonitrile (containing 22.5% by weight of SM and 7.5% by weight of AN) was used as the shell, r1 was 110 nm, r2 was 150 nm and the graft ratio was 28%. In this case, differences in refractive index and a gel content were the same as in Example 1.

Example 4

A thermoplastic resin composition was prepared in the same manner as in Example 1, except that 30% by weight of styrene was used as the seed, 40% by weight of butyl acrylate was used as the core, 30% by weight of styrene-acrylonitrile (containing 22.5% by weight of SM and 7.5% by weight of AN) was used as the shell, r1 was 135 nm, r2 was 175 nm and a graft ratio was 25%. In this case, differences in refractive index and gel content were the same as in Example 1.

Example 5

A thermoplastic resin composition was prepared in the same manner as in Example 1, except that 25% by weight of styrene was used as the seed, 45% by weight of butyl acrylate was used as the core and 30% by weight of styrene-acrylonitrile (containing 22.5% by weight of SM and 7.5% by weight of AN) was used as the shell, r1 was 80 nm, r2 was 110 nm, the graft ratio was 28% and the gel content was 90%. In this case, differences in refractive index were the same as in Example 1.

Example 6

A thermoplastic resin composition was prepared in the same manner as in Example 1, except that 25% by weight of styrene was used as the seed, 35% by weight of butyl acrylate was used as the core, 40% by weight of styrene-acrylonitrile (containing 30% by weight of SM and 10% by weight of AN) was used as the shell, r1 was 100 nm, r2 was 130 nm, the graft ratio was 40% and the gel content was 85%. In this case, differences in refractive index were the same as in Example 1.

Example 7

A thermoplastic resin composition was prepared in the same manner as in Example 1, except that 15% by weight of styrene was used as the seed, 45% by weight of butyl acrylate was used as the core, 40% by weight of styrene-acrylonitrile (containing 30% by weight of SM and 10% by weight of AN) was used as the shell, r1 was 70 nm, r2 was 120 nm and the graft ratio was 45%. In this case, differences in refractive index and gel content were the same as in Example 1.

Example 8

A thermoplastic resin composition was prepared in the same manner as in Example 1, except that 20% by weight of styrene was used as the seed, 45% by weight of butyl acrylate was used as the core, 35% by weight of styrene-acrylonitrile (containing 26.25% by weight of SM and 8.75% by weight of AN) was used as the shell, r1 was 100 nm and r2 was 150 nm. In this case, differences in refractive index, gel content and graft ratio were the same as in Example 1.

Example 9

A thermoplastic resin composition was prepared in the same manner as in Example 1, except that 25% by weight of styrene was used as the seed, 30% by weight of butyl acrylate was used as the core, 45% by weight of styrene-acrylonitrile (containing 33.75% by weight of SM and 11.25% by weight of AN) was used as the shell, r1 was 90 nm, r2 was 110 nm, the graft ratio was 45% and the gel content was 80%. In this case, differences in refractive index were the same as in Example 1.

Example 10

A thermoplastic resin composition was prepared in the same manner as in Example 1, except that 35% by weight of styrene was used as the seed, 30% by weight of butyl acrylate was used as the core, 35% by weight of styrene-acrylonitrile (containing 26.25% by weight of SM and 8.75% by weight of AN) was used as the shell, r1 was 115 nm and r2 was 135 nm. In this case, differences in refractive index, gel content and graft ratio were the same as in Example 1.

Example 11

A thermoplastic resin composition was prepared in the same manner as in Example 1, except that styrene-acrylonitrile-methyl methacrylate (containing 15% by weight of SM, 2% by weight of AN and 3% by weight of MMA) was used as the seed and the difference in refractive index between the seed of the acrylonitrile-acrylate-styrene graft copolymer and the matrix was lower than 0.03. In this case, gel content and graft ratio were the same as in Example 1.

Example 12

A thermoplastic resin composition was prepared in the same manner as in Example 1, except that styrene-butylacrylate (containing 15% by weight of SM and 5% by weight of BA) was used as the seed and the difference in refractive index between the seed of the acrylonitrile-acrylate-styrene graft copolymer and the matrix was lower than 0.03. In this case, gel content and graft ratio were the same as in Example 1.

Example 13

A thermoplastic resin composition was prepared in the same manner as in Example 1, except that styrene-acrylonitrile (containing 15% by weight of SM and 5% by weight of AN) was used as the seed and the difference in refractive index between the seed of the acrylonitrile-acrylate-styrene graft copolymer and the matrix was lower than 0.02. In this case, gel content and graft ratio were the same as in Example 1.

Example 14

A thermoplastic resin composition was prepared in the same manner as in Example 1, except that styrene-acrylonitrile-butyl acrylate (containing 12% by weight of SM, 4% by weight of BA and 4% by weight of AN) was used as the seed and the difference in refractive index between the seed of the acrylonitrile-acrylate-styrene graft copolymer and the matrix was lower than 0.03. In this case, gel content and graft ratio were the same as in Example 1.

Example 15

A thermoplastic resin composition was prepared in the same manner as in Example 1, except that butyl acrylate-2-ethyl hexyl acrylate (containing 25% by weight of BA and 20% by weight of 2-EHA) was used as the core and the difference in refractive index between the core of the acrylonitrile-acrylate-styrene graft copolymer and the matrix was 0.115. In this case, gel content and graft ratio were the same as in Example 1.

Example 16

A thermoplastic resin composition was prepared in the same manner as in Example 1, except that styrene-acrylonitrile-methyl methacrylate (containing 26.25% by weight of SM, 3.5% by weight of AN and 5.25% by weight of MMA) was used as the shell and the difference in refractive index between the shell of the acrylonitrile-acrylate-styrene graft copolymer and the matrix was lower than 0.03. In this case, gel content and graft ratio were the same as in Example 1.

Comparative Example 1

A thermoplastic resin composition was prepared in the same manner as in Example 1, except that 4% by weight of styrene was used as the seed, 55% by weight of butyl acrylate was used as the core, 41% by weight of styrene-acrylonitrile (containing 30.75% by weight of SM and 10.25% by weight of AN) was used as the shell, r1 was 55 nm, r2 was 135 nm and the graft ratio was 45%. In this case, differences in refractive index and gel content were the same as in Example 1.

Comparative Example 2

A thermoplastic resin composition was prepared in the same manner as in Example 1, except that 30% by weight of styrene was used as the seed, 40% by weight of butyl acrylate was used as the core, 30% by weight of styrene-acrylonitrile (containing 22.5% by weight of SM and 7.5% by weight of AN) was used as the shell, r1 was 50 nm, r2 was 70 nm and the graft ratio was 28%. In this case, differences in refractive index and gel content were the same as in Example 1.

Comparative Example 3

A thermoplastic resin composition was prepared in the same manner as in Example 1, except that 30% by weight of styrene was used as the seed, 40% by weight of butyl acrylate was used as the core, 30% by weight of styrene-acrylonitrile (containing 22.5% by weight of SM and 7.5% by weight of AN) was used as the shell, r1 was 140 nm, r2 was 190 nm and graft ratio was 28%. In this case, differences in refractive index and gel content were the same as in Example 1.

Comparative Example 4

A thermoplastic resin composition was prepared in the same manner as in Example 1, except that 10% by weight of styrene was used as the seed, 55% by weight of butyl acrylate was used as the core, 35% by weight of styrene-acrylonitrile (containing 26.25% by weight of SM and 8.75% by weight of AN) was used as the shell, r1 was 100 nm, r2 was 190 nm and graft ratio was 35%. In this case, differences in refractive index and gel content were the same as in Example 1.

Comparative Example 5

A thermoplastic resin composition was prepared in the same manner as in Example 1, except that 10% by weight of styrene was used as the seed, 50% by weight of butyl acrylate was used as the core, 40% by weight of styrene-acrylonitrile (containing 30% by weight of SM and 10% by weight of AN) was used as the shell, r1 was 75 nm, r2 was 115 nm, the difference in refractive index between the seed and the matrix, was higher than 0.035, and the graft ratio was 40%. In this case, differences in refractive index and gel content were the same as in Example 1.

Comparative Example 6

A thermoplastic resin composition was prepared in the same manner as in Example 1, except that styrene-acrylonitrile-methyl methacrylate (containing 7% by weight of SM, 3% by weight of AN and 10% by weight of MMA) was used as the seed and the difference in refractive index between the seed of the acrylonitrile-acrylate-styrene graft copolymer and the matrix was 0.04. In this case, gel content and graft ratio were the same as in Example 1.

Comparative Example 7

A thermoplastic resin composition was prepared in the same manner as in Example 1, except that styrene-butyl acrylate (containing 9% by weight of SM and 11% by weight of BA) was used as the seed and the difference in refractive index between the seed of the acrylonitrile-acrylate-styrene graft copolymer and the matrix was 0.05. In this case, gel content and graft ratio were the same as in Example 1.

Comparative Example 8

A thermoplastic resin composition was prepared in the same manner as in Example 1, except that styrene-acrylonitrile-butyl acrylate (containing 8% by weight of SM, 4% by weight of AN and 8% by weight of BA) was used as the seed and the difference in refractive index between the seed of the acrylonitrile-acrylate-styrene graft copolymer and the matrix was 0.05. In this case, gel content and graft ratio were the same as in Example 1.

Comparative Example 9

A thermoplastic resin composition was prepared in the same manner as in Example 1, except that butyl acrylate-styrene (containing 9% by weight of SM and 11% by weight of BA) was used as the core and the difference in refractive index between the core of the acrylonitrile-acrylate-styrene graft copolymer and the matrix was 0.05. In this case, the gel content and the graft ratio were the same as in Example 1.

Comparative Example 10

A thermoplastic resin composition was prepared in the same manner as in Example 1, except that butyl butadiene was used as the core and the difference in refractive index between the core of the acrylonitrile-acrylate-styrene graft copolymer and the matrix was 0.056. In this case, gel content and graft ratio were 94% and 45%, respectively.

Test Example

Properties of the ASA graft copolymer composition were evaluated by the following methods.

(1) Refractive index: a powder was compressed and a refractive index thereof was measured using a refractometer (Metricon 2010).

(2) Mean particle diameter of seed/core/shell: mean particle diameters of respective latexes were measured by a dynamic laser light scattering method using a NICOMP 380 particle size analyzer. Intensity was measured in a Gaussian measurement mode. In addition, regarding the prepared acrylonitrile-acrylate-styrene graft copolymer, maximum seed, core and shell diameters of particles corresponding to the top 10 percent of particle diameters were measured at Acc. Volt of 120 KV and at a ratio of SPOT size of 1 (×10K, ×25K, ×50K) using TEM (Jeol. JEM-1400) and averages thereof were calculated.

For reference, r1 was calculated by dividing the mean particle diameter of the seed in half, and r2 was calculated by dividing the mean particle diameter of the core including the seed in half.

(3) Izod impact strength (¼' notched at 23° C., kgf·cm/cm): measured in accordance with an ASTM D-256 method.

(4) Resin colorability: during resin processing, 0.1 wt % of carbon black was added and a value L of a sample for measuring colorability was measured using a color-difference meter. As the value of L decreased, color reached dark black which means that pigment colorability became better.

(5) Gloss (45°): measured in accordance with ASTM D528.

(6) Weather resistance: a sample was stood for 2,000 hours using a weatherometer in accordance with ASTM G155-1 and variation in color (ΔE) was then measured using a color-difference meter. ΔE represents an arithmetic mean value of CIE Lab values before and after weather resistance testing. As ΔE approaches zero (0), weather resistance becomes better.

(7) Gel content and graft ratio: acetone was added to 1 g of an ASA graft copolymer powder, followed by stirring at room temperature for 24 hours and centrifuging. Only the component not dissolved in acetone was collected and a weight thereof was measured before and after drying. Gel content was obtained by the following Equation.

Gel content (%)=weight of sample after centrifugation and drying/weight of sample×100

Graft ratio=weight of grafted monomer/weight of core polymer)×100

Measurement results of physical properties associated with Examples 1 to 16 and Comparative Examples 1 to 10 were summarized in the following Tables 1 to 3, based on rubber morphology of Equations 1 and 2, and differences in refractive index (difference in refractive index between seed or shell and matrix resin is 0.03 or less, and difference in refractive index between the core and matrix resin is 0.08 or more), etc.

TABLE 1

| Items | Comp. Exes. 1 to 5 | Comp. Exes. 6 to 8 | Comp. Exes. 9 and 10 |
|---|---|---|---|
| Refractive index of seed | | unsuitable | |
| Refractive index of core | | | unsuitable |
| Thickness and size of core | unsuitable | | |

TABLE 2

| Items | Impact strength | Weather resistance | Gloss | Colorability |
|---|---|---|---|---|
| Ex. 1 | 19 | 1.6 | 95 | 27.0 |
| Ex. 2 | 16 | 1.4 | 98 | 26.5 |
| Ex. 3 | 23 | 1.9 | 92 | 27.2 |
| Ex. 4 | 25 | 2.0 | 91 | 27.5 |
| Ex. 5 | 18 | 1.5 | 95 | 26.8 |
| Ex. 6 | 29 | 1.5 | 95 | 26.9 |
| Ex. 7 | 18 | 1.7 | 99 | 27.3 |
| Ex. 8 | 24 | 1.8 | 93 | 27.4 |
| Ex. 9 | 17 | 1.4 | 98 | 26.3 |
| Ex. 10 | 18 | 1.5 | 96 | 26.5 |
| Ex. 11 | 18 | 1.5 | 98 | 26.7 |
| Ex. 12 | 19 | 1.4 | 95 | 26.9 |
| Ex. 13 | 19 | 1.4 | 96 | 26.8 |
| Ex. 14 | 18 | 1.6 | 97 | 26.7 |
| Ex. 15 | 21 | 1.6 | 94 | 27.3 |
| Ex. 16 | 18 | 1.2 | 96 | 26.5 |

TABLE 3

| Items | Impact strength | Weather resistance | Gloss | Colorability |
|---|---|---|---|---|
| Comp. Ex. 1 | 22 | 2.0 | 85 | 29.0 |
| Comp. Ex. 2 | 6 | 1.5 | 95 | 26.5 |
| Comp. Ex. 3 | 25 | 1.7 | 81 | 29.3 |

TABLE 3-continued

| Items | Impact strength | Weather resistance | Gloss | Colorability |
|---|---|---|---|---|
| Comp. Ex. 4 | 25 | 1.6 | 88 | 29.8 |
| Comp. Ex. 5 | 21 | 1.5 | 75 | 30.6 |
| Comp. Ex. 6 | 16 | 1.4 | 95 | 29.2 |
| Comp. Ex. 7 | 20 | 1.5 | 91 | 29.5 |
| Comp. Ex. 8 | 19 | 1.5 | 93 | 29.4 |
| Comp. Ex. 9 | 7 | 1.6 | 95 | 26.5 |
| Comp. Ex. 10 | 25 | 8.6 | 98 | 26.5 |

As can be seen from Table 2 above, Examples 1 to 16 had similar or superior impact strength, excellent colorability and gloss, and superior appearance and weather resistance and good overall balance in physical properties, as compared to Comparative Examples 1 to 10.

Meanwhile, as can be seen from Table 3 above, Comparative Examples 1 to 5 having unsuitable core thicknesses and sizes exhibited deterioration in colorability when the thicknesses or sizes were higher than the upper limit, and exhibited greatly deterioration in impact strength when the thicknesses or sizes were lower than the lower limit. Comparative Examples 6 to 10 exhibited deterioration in colorability when refractive indexes of the seed and the matrix were unsuitable, and exhibited deterioration in weather resistance and impact strength when butadiene or styrene having a refractive index was used as the core.

What is claimed is:

1. A graft copolymer composition comprising:
    a graft copolymer comprising a seed, a core and a shell; and
    a matrix polymer,
    wherein a difference between a refractive index of the seed and a refractive index ($\mu_D^{25}$) of the matrix polymer is lower than 0.03,
    a difference between a refractive index of the shell, and a refractive index ($\mu_D^{25}$) of the matrix polymer is lower than 0.03,
    a difference between a refractive index of the core and a refractive index ($\mu_D^{25}$) of the matrix polymer is higher than 0.08, and
    the graft copolymer satisfies the following Equations 1 and 2:

$$200 \leq 2*r2 \leq 300 \quad \text{Equation 1}$$

$$20 \leq r2-r1 \leq 50 \quad \text{Equation 2}$$

wherein r1 represents a thickness (nm) from the center to the seed of the graft copolymer and r2 represents a thickness (nm) from the center to the core of the graft copolymer,
    wherein the graft copolymer has a graft ratio higher than 25% and a gel content lower than 90%, and the graft copolymer comprises a styrene, vinyl toluene or styrene monomer derivative; an alkyl (meth)acrylate compound; and acrylonitrile, methacrylonitrile or a mixture thereof, and
    wherein a weight ratio of the seed to the core to the shell is 10 to 35:30 to 55:30 to 45.

2. The graft copolymer composition according to claim 1, wherein the graft copolymer comprises:
    a seed comprising at least one compound of an aromatic vinyl compound, a vinyl cyanide compound and an alkyl (meth)acrylate compound;
    a rubber core surrounding the seed and comprising alkyl acrylate; and
    a shell surrounding the core and comprising at least one compound of an aromatic vinyl compound, a vinyl cyanide compound and an alkyl (meth)acrylate compound.

3. The graft copolymer composition according to claim 2, wherein the alkyl acrylate comprises at least one selected from methyl acrylate, ethyl acrylate, propyl acrylate, butyl acrylate, hexyl acrylate, octyl acrylate and 2-ethylhexyl acrylate.

4. The graft copolymer composition according to claim 2, wherein the aromatic vinyl compound comprises at least one selected from the group consisting of styrene, vinyl toluene and styrene monomer derivatives.

5. The graft copolymer composition according to claim 2, wherein the vinyl cyanide compound comprises acrylonitrile, methacrylonitrile or a mixture thereof.

6. The graft copolymer composition according to claim 2, wherein the alkyl (meth)acrylate compound comprises at least one selected from the group consisting of methyl acrylate, ethyl acrylate, propyl acrylate, butyl acrylate, 2-ethyl hexyl acrylate, methyl methacrylate, ethyl methacrylate, propyl methacrylate, 2-ethyl hexyl methacrylate, methyl ethacrylate and ethyl ethacrylate.

7. The graft copolymer composition according to claim 1, wherein the seed and/or the core comprises, as a cross-linking agent, at least one selected from the group consisting of divinylbenzene, 1,3-butanediol diacrylate, 1,3-butanediol dimethacrylate, 1,4-butanediol diacrylate, 1,4-butanediol dimethacrylate, aryl acrylate, aryl methacrylate, trimethylol propane triacrylate, tetraethylene glycol diacrylate, ethylene glycol dimethacrylate, diethylene glycol dimethacrylate, triethylene glycol dimethacrylate, neopentyl glycol dimethacrylate, triallyl isocyanurate, triarylamine, diallylamine and a compound represented by the following Formula 1:

Formula 1 wherein A independently represents a substitutent having a vinyl group or a (meth)acrylate group, and A' represents a hydrogen group, a substitutent having a vinyl group, a C1 to C30 alkyl group, a C5 to C24 arylalkyl group, a C5 to C24 arylamine group or a C6 to C30 aryl group, and R independently represents a divalent ethyl group or propyl group, and n is an integer of 5 to 15.

8. The graft copolymer composition according to claim 7, wherein the cross-linking agent is used in an amount of 0.01 to 5 parts by weight, based on 100 parts by weight in total of monomers used for preparation of the graft copolymer.

9. The graft copolymer composition according to claim 1, wherein the matrix polymer comprises at least one selected from hard matrix polymers comprising one or more of an aromatic vinyl compound, a vinyl cyanide compound and an alkyl (meth)acrylate compound.

10. The graft copolymer composition according to claim 1, wherein the graft copolymer and the matrix polymer are present at a weight ratio of 10:90 to 90:10.

11. The graft copolymer composition according to claim 1, wherein the graft copolymer composition comprises 0.1 to 10 parts by weight of at least one additive selected from the group consisting of a flame retardant, a lubricant, an antimicrobial agent, a release agent, a nucleating agent, a plasticizer, a thermo stabilizer, an anti-oxidant, a photostabilizer, a compatibilizer, a pigment, a dye and an inorganic additive, based on 100 parts by weight in total of the graft copolymer composition.

12. A molded article produced from the graft copolymer composition according to claim 1.

* * * * *